United States Patent [19]

Caillon et al.

[11] Patent Number: 5,348,823
[45] Date of Patent: Sep. 20, 1994

[54] PROCESS OF PREPARING AN ELECTRODE FOR AN ELECTROCHEMICAL CELL WITH A POROUS SUPPORT AND AN ELECTRODE OBTAINED BY SAID PROCESS

[75] Inventors: Georges Caillon, Bruges; Cyrille Lebarbier, Bordeaux-Cauderan, both of France

[73] Assignee: Saft S.A., Romainville, France

[21] Appl. No.: 173,263

[22] Filed: Dec. 23, 1993

Related U.S. Application Data

[63] Continuation of Ser. No. 2,095, Jan. 8, 1993, abandoned, which is a continuation of Ser. No. 725,929, Jul. 2, 1991, abandoned, which is a continuation of Ser. No. 489,522, Mar. 7, 1990, abandoned.

[30] Foreign Application Priority Data

Nov. 7, 1989 [FR] France ............................ 89 14588

[51] Int. Cl.$^5$ .......................................... H01M 4/04
[52] U.S. Cl. .................................. 429/246; 429/211; 429/217; 429/247; 429/254
[58] Field of Search ............... 429/211, 217, 246, 247, 429/254

[56] References Cited

U.S. PATENT DOCUMENTS

| | | | |
|---|---|---|---|
| 3,910,799 | 10/1975 | Kondo et al. | 429/246 |
| 4,212,179 | 7/1980 | Juergens | 29/623.1 |
| 4,251,603 | 2/1981 | Matsumoto et al. | |
| 4,283,469 | 8/1981 | Goebel et al. | 429/247 |
| 4,606,982 | 8/1986 | Nelson et al. | 29/623.3 |

FOREIGN PATENT DOCUMENTS

| | | |
|---|---|---|
| 0271043 | 6/1988 | European Pat. Off. |
| 50-145833 | 11/1975 | Japan |
| 54-72699 | 12/1980 | Japan |
| 60-191764 | 3/1987 | Japan |
| 2203280 | 10/1988 | United Kingdom |

OTHER PUBLICATIONS

Chemical Abstracts, vol. 84, No. 14, Apr. 5, 1976, p. 165, No. 96280g, Columbus, Ohio, JP-A-75 145 833 (Matsushita Electric Industrial Co., Ltd., Nov. 22, 1975).

Chemical Abstracts, vol. 91, No. 2, Jul. 9, 1979, p. 135, No. 7342a, Columbus, Ohio, JP-A-79 51 141 (Matsushita Electric Industrial Co., Ltd., Feb. 3, 1979).

Chemical Abstracts, vol. 99, No. 12, Sep. 19, 1983, p. 171, No. 91073j, Columbus, Ohio, JP-A-58 08 555 (Matsushita Electric Industrial Co., Ltd., Feb. 16, 1983).

*Primary Examiner*—Stephen Kalafut
*Assistant Examiner*—M. Nuzzolillo
*Attorney, Agent, or Firm*—Kenyon & Kenyon

[57] ABSTRACT

A process of preparing an electrode for an electrochemical cell comprising a foamlike porous metal support (1) loaded with active material, wherein, on each side of said support there is placed a separator layer (2, 3) made of polyolefin fibers, and wherein the assembly thus obtained is compressed so as to produce an adhesive bond between the layers of separator and the entire surface of said support.

6 Claims, 1 Drawing Sheet

PROCESS OF PREPARING AN ELECTRODE FOR AN ELECTROCHEMICAL CELL WITH A POROUS SUPPORT AND AN ELECTRODE OBTAINED BY SAID PROCESS

This is a continuation of application Ser. No. 08/002,095 filed Jan. 8, 1993, which was a continuation of Ser. No. 07/725,929 filed Jul. 2, 1991, which was a continuation of Ser. No. 07/489,522 filed Mar. 7, 1990, all prior applications being abandoned.

BACKGROUND OF THE INVENTION

This invention relates to a process of preparing an electrode for an electrochemical cell with a porous support and an electrode obtained by said process. It more particularly but not exclusively relates to electrochemical cells having alkaline electrolytes with helical electrodes wherein at least one electrode comprises a porous metal support loaded with active material. This support displays a matrix structure similar to that of a sponge wherein the cells are interconnected in a three-dimensional matrix: It is referred to as "foamlike" material. The porosity of the foamlike material, exclusive of active material, is greater than 90%.

After the active material is loaded in the electrode, said electrode is compressed so as to adjust its thickness, to facilitate its assembly, thereby ensuring proper operation of the cell.

When two electrodes are helically wound with an interposed separator strip, it is necessary to employ a separator displaying a high tensile strength (greater than 50 N for a separator having a width of 5 cm for example). Such a separator is ordinarily composed of a sheet made of polyamide or polypropylene fibers having a diameter on the order of 25 micrometers.

For electrochemical reasons, it would be advantageous to create a separator having much finer fibers, that is, of a diameter on the order of 5 micrometers or even less. However, the tensile strength of such a separator would be much too low to enable it to be helically wound with two electrodes using known methods.

SUMMARY OF THE INVENTION

The object of this invention is to obviate this disadvantage and to provide for the embodiment of separators having very fine fibers, particularly in accumulators with helical electrodes.

The object of this invention is a process of preparing an electrode for an electrochemical cell comprising a foamlike porous metal support loaded with active material, wherein there is placed on each side of said support a layer of a separator made of polyolefin fibers, and wherein the assembly obtained in this manner is compressed so as to produce an adhesive bond between the separator layers and the entire surface of said support.

A strong adhesive bond is achieved between the separators and the support due to the nature of said support. Indeed, such an adhesive bond does not exist in the case of electrodes of the sintered type, the plastic-coated type or the felt type.

By virtue of the aforesaid process, an electrode with a "foamlike" support may be equipped with separators of polyolefin fibers with a diameter of less than 5 micrometers, wherein these separators display a tensile strength which is one-tenth that displayed by conventional separators.

The gram weight of these separators preferably ranges from 5 to 50 $g/m^2$.

Such electrodes may be helically wound using the usual winding processes, with the possible addition of another interposed separator. Such a separator, made of polyamide or polypropylene, comprises fibers of a diameter on the order of 20 micrometers, with a gram weight ranging from 60 to 90 $g/m^2$.

According to a preferred embodiment, the dimensions of the two layers of separator are selected such that these two layers may be joined and thus protect the edges of the support. Of course, the elongation of the various components during compression should be taken into consideration.

It is preferable for said support to be equipped with its electrical connection prior to adding its two separator layers.

A further object of this invention is an electrode for an electrochemical cell comprising a foamlike porous metal support, which is filled with active material and equipped with an electrical connection, wherein on both of its sides there are embedded, respectively, two layers of a separator of polyolefin fibers having a diameter of less than 5 micrometers, wherein the gram weight of said separator ranges from 5 to 50 $g/m^2$.

This invention displays numerous advantages.

First, the fibrous structure of the separator substantially improves the flexibility of the electrode. This greatly facilitates winding. Furthermore, it is possible to employ foamlike supports that are more fragile or have lower gram weights than the usual supports.

In addition, for a given quantity of separator material, the separator consisting of very fine fibers according to the invention displays increased permeability to the electrolyte and improved filtering and insulating capacities to prevent the passage of undesirable solids and electrons through the separator, while retaining the same permeability to ions.

The process according to the invention provides for incorporating an additional intermediate separator; should one of the separator layers contain a defect which might weaken its filtering and insulating properties at a given point, the superimposition of several layers will almost completely compensate for the effects of such a defect.

Because separators having very fine fibers are less expensive than conventional separators, it is possible to either lower the total cost of separators in a battery or to adopt the option of multiple layers to provide improved performance at the same cost.

Finally, the two separator layers of an electrode according to the invention protect the environment from particles of active material which the electrode may release. This obviates the need for treating the surface and body of these electrodes with particle removal products, a treatment known as fibrillation or "post-coating." The amount of particulate matter present at the work stations is substantially reduced. This results in improved working conditions and reduced risks to the health of the operators.

Although the process according to the invention is particularly advantageous for the helical electrodes of cylindrical batteries, it is also extremely useful for flat electrodes. Indeed, electrodes with a porous support are obtained wherein the coating is bonded to the entire surface of the support; many of the aforesaid advantages therefore also apply in this instance.

DETAILED DESCRIPTION

Example 1

Figure 1:
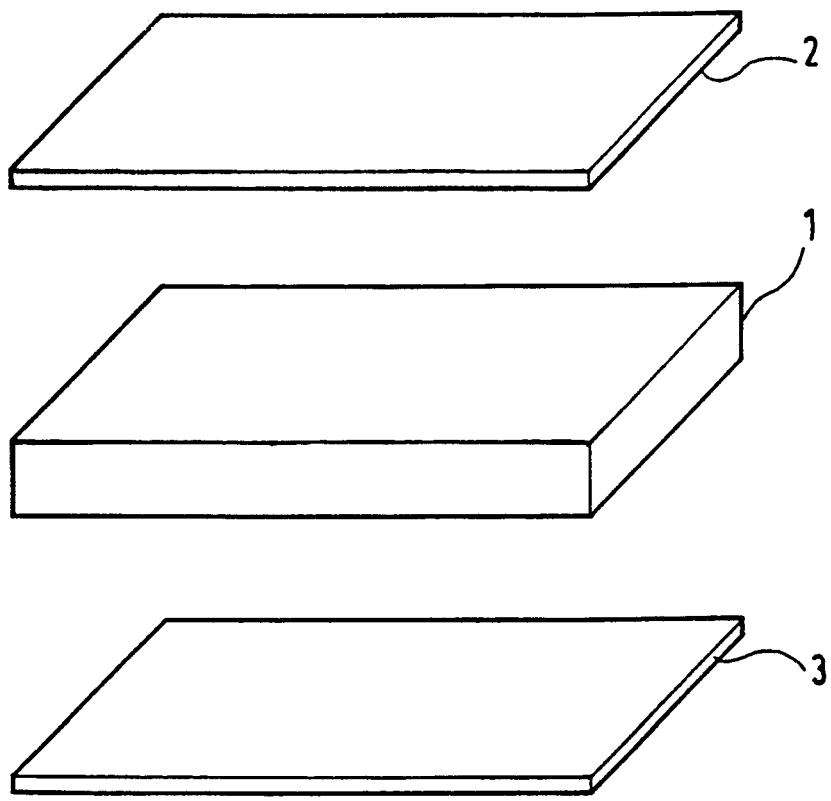
FIG. 1 is an exploded perspective drawing of an electrode support according to the invention with two layers of separator prior to compression.

FIG. 1 shows a support 1 made of porous nickel, with a gram weight of 5 g/dm$^2$ and a thickness of 1.1 mm, displaying an initial porosity greater than 90%. This support is loaded with 17 g/dm$^2$ of active material made of nickel hydroxide, cobalt and cadmium. This support may be equipped with an electrical connection (not shown).

Two layers of separators 2 and 3 are placed on either side of the support 1. Each has a thickness on the order of 0.1 mm and is made of polypropylene fibers with a diameter ranging from 0.5 to 5 micrometers inclusive. Its gram weight is 50 g/m$^2$.

Figure 2:
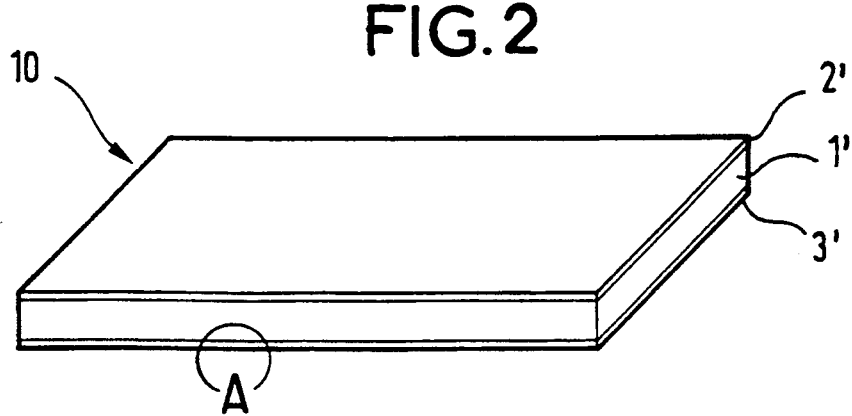
FIG. 2 is a perspective drawing of the components of FIG. 1 after compression.
Figure 3:
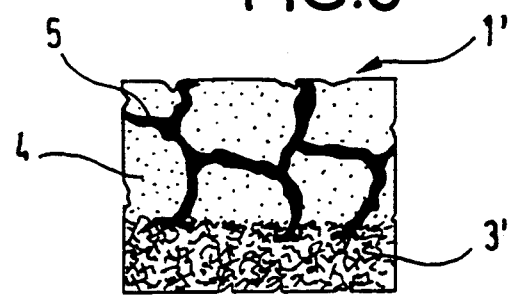
FIG. 3 is an enlarged view of a detail A of FIG. 2.

After compression, an electrode 10 with a thickness of 0.7 mm (see FIG. 2) and three components 1', 2', 3' is obtained. The thickness of each layer 2', 3' is on the order of 0.015 mm. FIG. 3 shows, on an enlarged scale, the nickel walls 5 of the support 1' forming cavities for the active material 4; the fibers of the separator 3' are embedded in the support 1', which ensures a very strong adhesive bond over the entire surface of this support.

The electrode 10 is associated to a conventional cadmium negative electrode to produce a nickel-cadmium battery with helical electrodes. During the winding operation, a piece of a conventional polyamide separator with a gram weight ranging from 70 to 90 g/m$^2$ is employed to initiate the operation and to better protect the core of the spiral which always constitutes the area with the highest exposure to insulation defects.

Example II

The same procedure is followed as in Example I using a support 1 of porous nickel with a gram weight of 3.5 g/dm$^2$ and a thickness of 1.1 mm, loaded with 17 g/dm$^2$ of active material composed of cobalt, cadmium and nickel hydroxide. The gram weight of the separator layers is 16 g/m$^2$ and the diameter of its constituent polypropylene fibers ranges from 0.5 to 5 micrometers.

The electrode 10 with its two separator layers 2' and 3' embedded in the support 1' displays a thickness of 0.7 mm after compression. It is associated to a conventional negative electrode as in Example I, with an additional intermediate separator having fibers with a diameter of 25 micrometers, displaying a gram weight of 60 g/m$^2$ that is less than that of conventional separators.

Example III

The same support is employed as that of Example II loaded with the same active material at 18 g/dm$^2$.

The gram weight of the separator layers is 25 g/m$^2$ and the diameter of the polypropylene fibers ranges from 0.5 to 5 micrometers. The assembly is compressed such that the positive electrode 10 is 0.7 mm thick.

A negative electrode is made according to the same process, wherein the gram weight of the porous support is 5 g/dm$^2$ and wherein the active material is an alloy of lanthanum and nickel. The active material load is 7 g/dm$^2$. To this support there are associated two separator layers made of polypropylene fibers with a diameter ranging from 0.5 to 5 micrometers inclusive, and having a gram weight of 25 g/m$^2$. The assembly is compressed such that the negative electrode has a thickness of 0.4 mm.

These two electrodes are placed face to face and helically wound to form a low pressure nickel-hydrogen cell. During the winding operation, a piece of conventional separator is employed as in the first example.

Of course, the invention is not limited to the examples which have just been described. Any equivalent means may be substituted for the means described without departing from the scope of the invention.

We claim:

1. A process of preparing an electrode for an electrochemical generator comprising the following steps:
   loading a porous metallic sponge support having a porosity greater than 90% with an active material;
   placing on each face of said loaded support a separator layer consisting of polyolefin fibers, the fibers having diameters less than 5 μm and the mass of said separator layer being between 5 and 50 g/m$^2$; and
   compressing the assembly obtained in the previous step sufficiently to obtain an embedment of the fibers into the metallic support and a consequent adherence of the separator layers over the entire surface of the support.

2. A process according to claim 1 wherein the dimensions of said separator layers are selected such that the edges of the separators may be joined so as to protect the edges of the support.

3. A process according to claim 1 further comprising the step of equipping said support with an electrical connection prior to placing a separator layer on each face of the support.

4. A process according to claim 1 and further comprising the step of winding the electrode with a similar electrode of opposite polarity to produce a spiral-wound electrode assembly.

5. An electrode for an electrochemical cell, the electrode comprising:
   a porous metal foam support having a porosity greater than 90%, the support being loaded with active material and equipped with an electrical connection; and
   a separator layer consisting of polyolefin fibers, the fibers having a diameter of less than 5 μm and the mass of said separator layer being between 5 and 50 g/m$^2$, fibers of the separator layer being embedded in the porous metal over the entire surface of each side of said support.

6. An electrode according to claim 5 wherein the electrode is wound in a spiral.

* * * * *

UNITED STATES PATENT AND TRADEMARK OFFICE
CERTIFICATE OF CORRECTION

PATENT NO. : 5,348,823

DATED : September 20, 1994

INVENTOR(S) : Georges Caillon, et al

It is certified that error appears in the above-indentified patent and that said Letters Patent is hereby corrected as shown below:

On the title page, item [57] Abstract, should be deleted and replace with the following Abstract:

-A process of preparing an electrode for an electrochemical cell. A foamlike porous metal support is loaded with active material, and then a separator layer made of polyolefin fibers is placed on each side of the support. The assembly of the support and the two separator layers is then compressed to produce an adhesive bond between the separator layers and the entire surface of the support.-

Column 4, line 12, change "7" to --17--.

Signed and Sealed this

Twenty-first Day of February, 1995

Attest:

BRUCE LEHMAN

Attesting Officer     Commissioner of Patents and Trademarks